United States Patent
Choi et al.

(10) Patent No.: US 8,725,416 B2
(45) Date of Patent: May 13, 2014

(54) APPARATUS FOR RECOGNIZING POSITION USING RANGE SIGNALS AND METHOD THEREOF

(75) Inventors: Hyun-Do Choi, Yongin-si (KR); Jun-Ho Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/071,852

(22) Filed: Mar. 25, 2011

(65) Prior Publication Data

US 2011/0320123 A1 Dec. 29, 2011

(30) Foreign Application Priority Data

Jun. 29, 2010 (KR) .................. 10-2010-0062360

(51) Int. Cl.
*G01S 13/02* (2006.01)
*G05D 1/02* (2006.01)
*G01S 5/02* (2010.01)

(52) U.S. Cl.
CPC ........... *G01S 13/0209* (2013.01); *G01S 5/0252* (2013.01); *G05D 1/028* (2013.01); *G05D 2201/0203* (2013.01)
USPC .......................................... 701/518; 701/300

(58) Field of Classification Search
USPC .......................................................... 701/300
IPC ................................................. G05D 1/02,1/10
See application file for complete search history.

(56) References Cited

U.S. PATENT DOCUMENTS

| 7,573,403 | B2 * | 8/2009 | Goncalves et al. | ........ | 340/995.1 |
| 2010/0110412 | A1 * | 5/2010 | Basu et al. | ........ | 356/3 |

FOREIGN PATENT DOCUMENTS

| JP | 5-027832 | A | 2/1993 |
| JP | 6-119038 | A | 4/1994 |
| KR | 10-0784125 | B1 | 12/2007 |
| KR | 10-0876561 | B1 | 12/2008 |
| KR | 10-0919944 | A | 10/2009 |

OTHER PUBLICATIONS

Bishop et al. "A stochastically stable solution to the problem of robocentric mapping", IEEE International Conference on Robotics and Automation, May 2009, pp. 1615-1622.*

Boberg et al. "Robocentric mapping and localization in modified spherical coordinates with bearing measurements", 5th International Conference on Intelligent Sensors, Sensor Networks and Information Processing (ISSNIP), Dec. 2009, pp. 139-144.*

(Continued)

*Primary Examiner* — John R Olszewski
*Assistant Examiner* — Todd Melton
(74) *Attorney, Agent, or Firm* — Sughrue Mion, PLLC (57) ABSTRACT

A position recognizing apparatus and method is provided. The position recognizing apparatus includes a range sensor which senses a distance between the position recognizing apparatus and a range landmark, and a candidate range landmark information generating unit which generates information about candidate range landmarks. The candidate range landmark information is modeled using a position and a posture of the position recognizing apparatus, the sensed distance and an angle between the range landmark and the position recognizing apparatus. The position recognizing apparatus further includes a range landmark extracting unit which, if a new distance is sensed, updates the candidate range landmark information and extracts actual range landmark information from the candidate range landmark information, and a position recognizing unit which recognizes a position of the position recognizing apparatus based on the extracted actual range landmark information.

13 Claims, 7 Drawing Sheets

(56) References Cited

OTHER PUBLICATIONS

Burschka et al. "V-GPS(SLAM): vision-based inertial system for mobile robots", IEEE International Conference on Robotics and Automation, Apr. 2004, pp. 409-415.*

Djugash et al. "Modeling mobile robot motion with polar representations", IEEE/RSJ International Conference on Intelligent Robots and Systems, Oct. 2009, pp. 2096-2101.*

Park et al. "Autonomous Mobile Robot Navigation Using Passive RFID in Indoor Environment", IEEE Transactions on Industrial Electronics, vol. 56 No. 7, Jul. 2009, pp. 2366-2373.*

Djugash et al., "A Robust Method of Localization and Mapping Using Only Range", Robotics Institute, 2008, pp. 1-15.*

Byun, Sung-Jae et al., "The Motion Estimation of Caterpilla-type Mobile Robot Using Robust SLAM", Trans. KIEE. vol. 58, No. 4, Apr. 2009, p. 817-823.

* cited by examiner

RELATED ART

APPARATUS FOR RECOGNIZING POSITION USING RANGE SIGNALS AND METHOD THEREOF

CROSS-REFERENCE TO RELATED APPLICATION

This application claims the benefit under 35 U.S.C. §119(a) of Korean Patent Application No. 10-2010-0062360, filed on Jun. 29, 2010, the disclosure of which is incorporated by reference in its entirety for all purposes.

BACKGROUND

1. Field

The following description relates to localization technology, and more particularly, to an apparatus and method for recognizing a position using range signals.

2. Description of the Related Art

A related art range only (RO) sensor refers to a sensor sensing signals received using a global positioning system (GPS), an ultra wideband (UWB), and Wireless Fidelity (Wi-Fi), the received signals only indicating a distance from a range landmark.

Different from a landmark using an image, the related art RO sensor has its own identifier, making it distinguishable from other landmarks. However, the related art RO sensor does not have angular information between a position recognizing apparatus and a landmark, and only has range information between the related art RO sensor and a range landmark. Accordingly, even if the position of the range landmark is estimated using the sensed range information and the travelling distance of the position recognizing apparatus, the sensed distance and the travelling distance of the position recognizing apparatus each have errors, also causing errors in estimating the position of the range landmark.

In the related art, to optimize the errors of the sensed distance and the travelling distance of the position recognizing apparatus at the same time, a simultaneous localization and mapping (SLAM) algorithm is used. The SLAM algorithm represents an algorithm which enables simultaneous estimation of the position of a position recognizing apparatus and a map of an environment of the position recognizing apparatus by repeating a consecutive motion including building a map of the environment of the position recognizing apparatus and localizing the position recognizing apparatus, which has moved to a new position, based on the built map.

Figure 7:
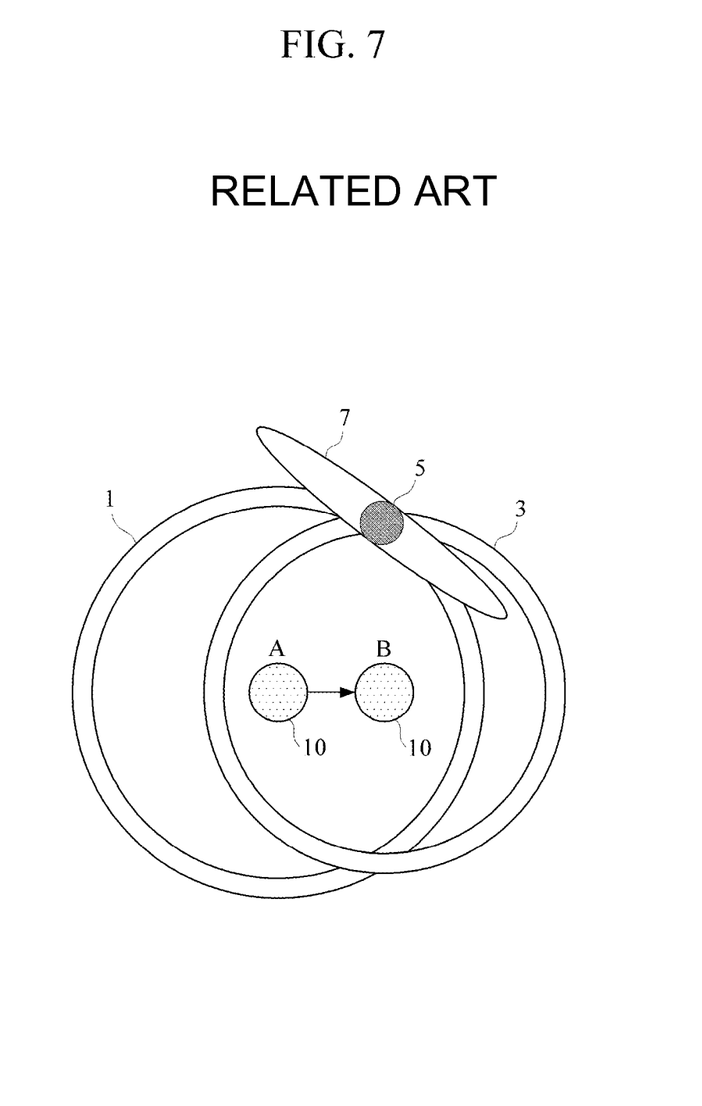
FIG. 7 is a diagram illustrating the probability distribution of a range landmark expressed in a Gaussian distribution, if the range landmark is expressed in a Cartesian coordinate system.

FIG. 7 is a diagram illustrating the related art probability distribution of the existence of a range landmark expressed in a Gaussian distribution, when the range landmark is expressed in a Cartesian coordinate system.

The related art RO sensor senses only the distance between the position recognizing apparatus and the landmark, so the probability distribution of existence of the range landmarks is expressed as a circular band. As shown in FIG. 7, if the position recognizing apparatus 10 exists at a position A, the probability distribution of existence of the range landmark is a circular band 1. If the position recognizing apparatus 10 exists at a position B, the probability distribution of existence of the range landmark is a circular band 3. If the position of the range landmark is estimated while the position recognizing apparatus 10 is moving from the position A to the position B, the probability distribution of the range landmark is reduced and converges, and finally the position of the range landmark is estimated.

In this case, if the position of the range landmark is modeled in the Cartesian coordinate system such as $L_x$, $L_y$, the probability distribution of the existence of the range landmark may be modeled as a Gaussian distribution 7 for an estimated range landmark 5. However as the probability distribution of the existence of a range landmark is modeled as a Gaussian distribution for a range landmark modeled in a Cartesian coordinate system, the Gaussian distribution has a shape deviating from the circular ring type distribution, causing errors in estimating the position of the range landmark. In addition, if a probability distribution model having a circular ring shape is modeled into a plurality of Gaussian distribution models, the computation required for estimating the position of the range landmark is increased, thereby requiring substantial computing resources and time in estimating the range landmark.

SUMMARY

One or more embodiments provide an apparatus and method for recognizing a position by estimating the position of a range landmark in consideration of characteristics of range information sensed by a range sensor.

According to an aspect of an embodiment, there is provided a position recognizing apparatus including a range sensor, a candidate range landmark information generating unit, a range landmark extracting unit and a position recognizing unit. The range sensor is configured to sense a distance between the position recognizing apparatus and a range landmark. The candidate range landmark information generating unit is configured to generate a plurality of pieces of information about a plurality of candidate range landmarks, in which the plurality of pieces of candidate range landmark information are modeled using a position and a posture of the position recognizing apparatus, the sensed distance and an angle between the range landmark and the position recognizing apparatus. If a new distance is sensed, the range landmark extracting unit is configured to, update the plurality of pieces of candidate range landmark information, and extract actual range landmark information from the plurality of pieces of candidate range landmark information. The position recognizing unit is configured to recognize a position of the position recognizing apparatus by use of the extracted actual range landmark information.

If a range signal generator corresponding to the range landmark is located at an identical plane to a plane where the position recognizing apparatus moves, the candidate range landmark information generating unit models the candidate range landmark in a polar coordinate system.

If a range signal generator corresponding to the range landmark is located at a plane different from a plane where the position recognizing apparatus moves, the candidate range landmark information generating unit models the candidate range landmark in a spherical coordinate system.

The candidate range landmark information generating unit generates the plurality of pieces of candidate range landmark information based on a travelling direction of the position recognizing apparatus.

In a case that the candidate range landmark is modeled in the polar coordinate system, the candidate range landmark information generating unit generates the candidate range landmark mark information at a first angular position, which is distant from the position recognizing apparatus by the sensed distance in the travelling direction of the position recognizing apparatus, at a second angular position which proceeds from the first angular position by a preset angle based on the travelling direction of the position recognizing apparatus, and a third angular position which recedes from the first angular position by an angle based on the travelling direction of the position recognizing apparatus.

In a case that the candidate range landmark mark is modeled as the spherical coordinate system, if the spherical coordinate system is divided into a lower part, an upper part, a front part and a rear part with respect to the travelling direction of the localization apparatus. The candidate range landmark information generating unit generates the plurality of pieces of candidate range landmark mark information covering the front part and the upper part.

The range landmark extracting unit determines the actual range landmark information by use of a covariance of the updated plurality of pieces of candidate range landmark information.

The range landmark extracting unit performs a number of updates on the plurality of pieces of candidate range landmark information and determines candidate range landmark information producing a relatively smallest covariance value among the respective pieces of candidate range landmark information, as the actual range landmark information.

The range landmark extracting unit determines candidate range landmark information producing a covariance value having a highest convergence speed among the respective pieces of candidate range landmark information, as the actual range landmark information.

The range landmark extracting unit uses at least one of a position of the position recognizing apparatus estimated using an image landmark, and a position of the position recognizing apparatus estimated using previously registered range landmark information.

According to an aspect of another embodiment, there is provided a position recognizing method. A distance between a range landmark and a position recognizing apparatus is sensed. A plurality of pieces of information about a plurality of candidate range landmarks are generated, in which the plurality of pieces of candidate range landmark information are modeled using a position and a posture of the position recognizing apparatus, the sensed distance and an angle between the range landmark and the position recognizing apparatus. If a new distance is sensed, the plurality of pieces of candidate range landmark information is updated. Actual range landmark information is extracted from the plurality of pieces of candidate range landmark information based on a result of the updating. A position of the position recognizing apparatus is recognized based on the extracted actual range landmark information.

BRIEF DESCRIPTION OF THE DRAWINGS

The above and/or other aspects will become more apparent by describing in detail exemplary embodiments with reference to the attached drawings in which.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness. Elements, features, and structures are denoted by the same reference numerals throughout the drawings and the detailed description. The size and proportions of some elements may be exaggerated in the drawings for clarity and convenience.

Figure 1:
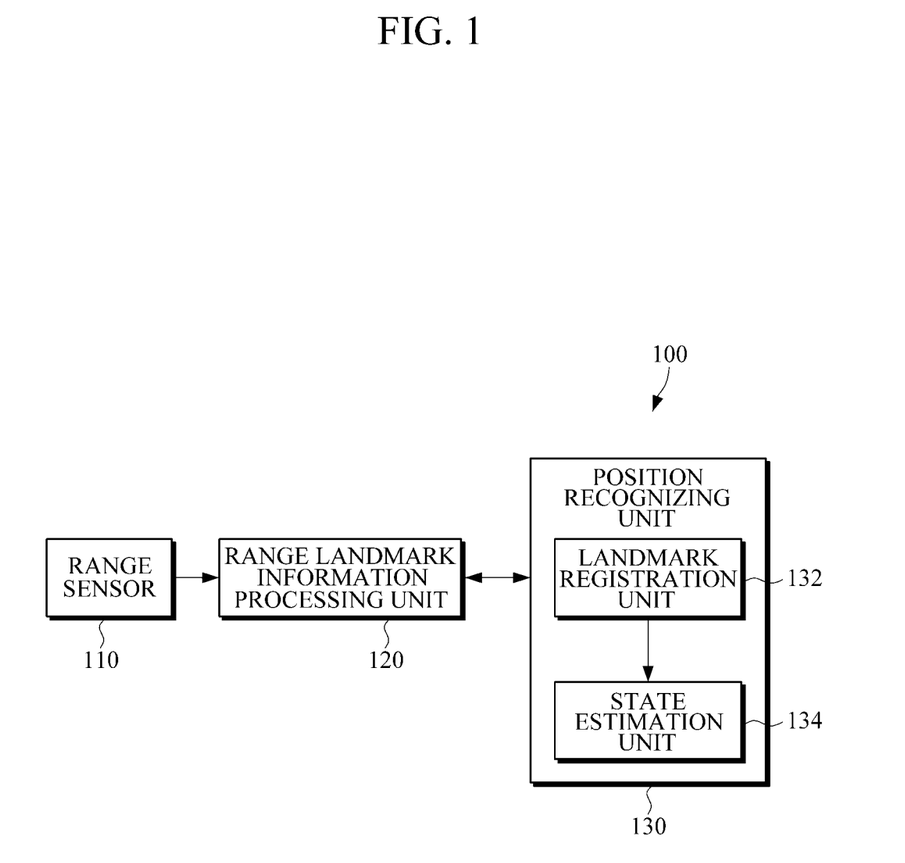
FIG. 1 is a block diagram illustrating an exemplary position recognizing apparatus according to an embodiment.

FIG. 1 is a block diagram illustrating an exemplary position recognizing apparatus according to an embodiment. A position recognizing apparatus 100 includes a range sensor 110, a range landmark information processing unit 120 and a position recognizing unit 130. The position recognizing apparatus 100 may be implemented using a camera, a mobile robot and a terminal apparatus including a camera, but is not limited thereto, and may be implemented by other equivalent structures, as would be understood by those skilled in the art.

The range sensor 110 represents a range only (RO) sensor. The range sensor 110 receives a range signal and senses the distance from a range landmark to the position recognizing apparatus 100. The range landmark represents a Wi-Fi generator and a UWB generator for generating a range signal. In general, an apparatus for transmitting a signal used to measure a distance, for example, a Wi-Fi generator and a UWB generator, has its own identifier (ID) and transmits a range signal together with the ID. The range sensor 110 may be implemented using at least one of a Wi-Fi receiver and a UWB receiver.

The range landmark information processing unit 120 processes a range signal or a range data received from the range sensor 110 and generates range landmark information. The range landmark information processing unit 120 determines whether the generated range landmark information is previously registered landmark information, by use of an ID which may be included in the range signal or transmitted together with the range signal. The range landmark information processing unit 120 compares an ID included in newly input range landmark information with an ID included in previously registered range landmark information, thereby determining whether a newly input range landmark is matched to a previously registered range landmark.

The range signal indicates only the distance between the range landmark and the position recognizing apparatus 100 (or the range sensor 110). Accordingly, the range landmark information processing unit 120 generates a plurality of pieces of range landmark information on a single range landmark and extracts actual range landmark information through range landmark estimation based on range signal sensing.

The range landmark information processing unit 120 may generate a plurality of pieces of candidate range landmark information that are modeled using a position and a posture of the position recognizing apparatus 100, sensed distance between a range landmark and the position recognizing apparatus 100, and an angle between a range landmark and the position recognizing apparatus 100. As a new distance is sensed, the range landmark information processing unit 120 updates the plurality of pieces of candidate range landmark information and extracts actual range landmark information from the plurality of pieces of candidate range landmark information. The distance landmark information processing unit 120 may update the plurality of pieces of candidate range landmark information by use of a position estimation algorithm such as a particle filter, a Kalman filter and an information filter. However, the exemplary embodiment is not limited to the above algorithms, and other equivalent algorithms may be used, as would be understood by those skilled in the art.

The position recognizing unit 130 registers the extracted actual range landmark information as a range landmark to be used for position recognition, and performs position recognition using the registered range landmark. The position recognizing unit 130 may estimate a position and a direction angle based on a starting position and a starting direction angle of the position recognizing apparatus 100. The position recognizing unit 130 is configured to build a map of a space where the position recognizing apparatus 100 moves while recognizing the position of the position recognizing apparatus 100 based on the extracted range landmark information.

The position recognizing unit 130 may include a landmark registration unit 132 and a state estimation unit 134.

The landmark registration unit 132 registers the actual range landmark information extracted from the range landmark information processing unit 120 as range landmark information for position recognition. The landmark registration unit 132 may include a storage (not shown). The storage may be provided at another location of the position recognizing apparatus 100.

The state estimation unit 134 estimates a state variable including the position of the position recognizing apparatus 100 by use of the actual range landmark information input from the landmark registration unit 132. The state estimation unit 134 may perform position estimation by use of a position estimation algorithm such as a particle filter, a Kalman filter and an information filter, but as explained above, embodiments are not limited thereto, and other algorithms as would be understood by those skilled in the art may be applied.

A system equation of the state variable $x_k$ used in the range landmark information processing unit 120 and the state estimation unit 134 is defined as equation 1.

$$x_k = F_k x_{k-1} + B_k u_k + w_k \qquad \text{[Equation 1]}$$

$F_k$ is a state transition matrix for connecting a current state variable to a next state variable, $B_k$ is the control-input model which is applied to $u_k$, $u_k$ is an input variable, $w_k$ is system noise, and k is a count value denoting a timing point (e.g., predetermined) increasing by 1.

A measurement equation used to determine an observation vector is defined as equation 2.

$$z_k = H_k x_k + v_k \qquad \text{[Equation 2]}$$

$z_k$ is an observation vector, and $H_k$ is a matrix involving measurement at a corresponding time. $v_k$ is observed noise and represents the uncertainty of a measurement equation.

Although not shown in drawing, the position recognizing apparatus 100 shown in FIG. 1 may further comprise an image sensor and a unit for generating image landmarks and image landmark information including an image landmark descriptor from an image that is obtained through the image sensor. The image landmark may represent a point capable of specifying a shape, for example, an edge or a corner of an object. The image landmark descriptor may be a local image for each landmark, directivity information about an image, or vector information about an image. In this case, the landmark registration unit 132 of the position recognizing unit 130 registers the image landmark, and the state estimation unit 134 predicts a state variable including the positions of the position recognizing apparatus 100, the range landmark and the image landmark to achieve the position recognition and the map building.

Figure 2:
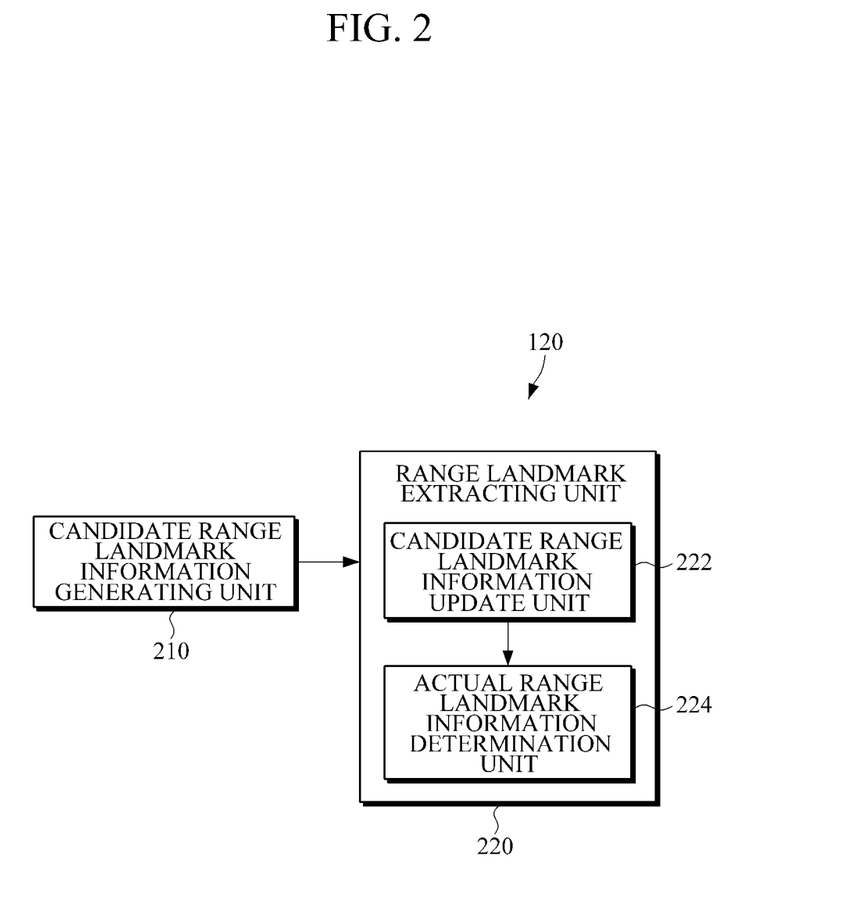
FIG. 2 is a block diagram illustrating an exemplary range landmark information processing unit shown in FIG. 1 according to an embodiment.

FIG. 2 is a block diagram illustrating an exemplary configuration of a range landmark information processing unit shown in FIG. 1 according to an embodiment.

The range landmark information processing unit 120 includes a candidate range landmark information generating unit 210 and a range landmark extracting unit 220.

The candidate range landmark information generating unit 210 generates a plurality of pieces of information about a plurality of candidate range landmarks based on a travelling direction of the position recognizing apparatus 100. If a range landmark or a range signal generator corresponding to the range landmark is located at an identical plane to a plane where the position recognizing apparatus 100 moves, the candidate range landmark information generating unit 210 models the candidate range landmark in a polar coordinate system. If a range landmark or a range signal generator corresponding to the range landmark is located at a plane different from a plane where the position recognizing apparatus 100 moves, the candidate range landmark information generating unit 210 models the candidate range landmark in a spherical coordinate system.

A method of generating candidate range landmarks is described in detail with reference to FIGS. 3 and 4.

Figure 3:
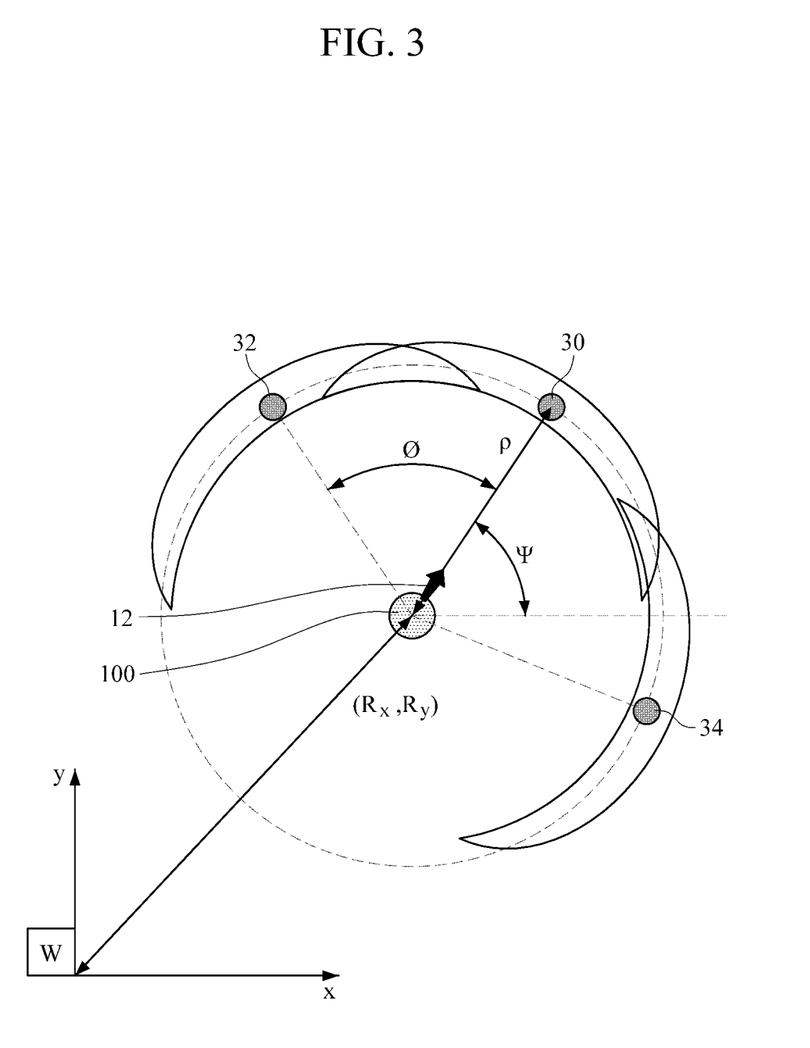
FIG. 3 is a diagram that illustrates a range landmark modeled in a polar coordinate system.

FIG. 3 is a diagram illustrating a range landmark modeled in a polar coordinate system.

A range landmark is expressed based on an initial position of the position recognizing apparatus 100 when the position recognizing apparatus 100 initially observes a range landmark. As described above, the range landmark is modeled using the position and the posture of the position recognizing apparatus 100, and the distance and the angle between the range landmark and the position recognizing apparatus 100 observed by the range sensor 110. The position of the position recognizing apparatus 100 is expressed in 2-dimensional coordinates in the world coordinate system. The range landmark is modeled as Equation 3 using the polar coordinate system.

$$\overline{L} = [R_x R_y \psi \rho \phi] \qquad \text{[Equation 3]}$$

$R_x$ and $R_y$ represent the initial position of the position recognizing apparatus 100, and $\psi$ represents the posture of the position recognizing apparatus 100. $\rho$ represents the distance sensed by the range sensor 110, and $\phi$ represents the angle that may be set depending on a model to set the candidate range landmark, based on the initial travelling direction of the position recognizing apparatus 100.

The position ($L_x$, $L_y$) of the range landmark modeled in the polar coordinate system is defined as Equation 4.

$$\begin{pmatrix} L_x \\ L_y \end{pmatrix} = \begin{pmatrix} R_x \\ R_y \end{pmatrix} + \rho \begin{pmatrix} \cos(\psi + \phi) \\ \sin(\psi + \phi) \end{pmatrix} \qquad \text{[Equation 4]}$$

Except for a case where the range sensor 110 of the position recognizing apparatus 100 is suddenly turned on, there is little chance that a range landmark exists at a position corresponding to the opposite direction to the travelling direction of the position recognizing apparatus 100. Accordingly, the candidate range landmark generating unit 210 generates candidate range landmark mark information at (i) angular position distant from the position recognizing apparatus by the sensed distance in the travelling direction of the position recognizing apparatus 100, at (ii) angular position which proceeds from (i) angular position by a preset angle φ based on the travelling direction of the position recognizing apparatus 100, and at (iii) angular position which recedes from (i) angular position by a preset angle φ based on the travelling direction of the position recognizing apparatus 100. For example, φ may be set to 45 degrees. As shown in FIG. 3, candidate range landmarks 30, 32 and 34 are generated based on the travelling direction 12 of the position recognizing apparatus 100.

Figure 4:
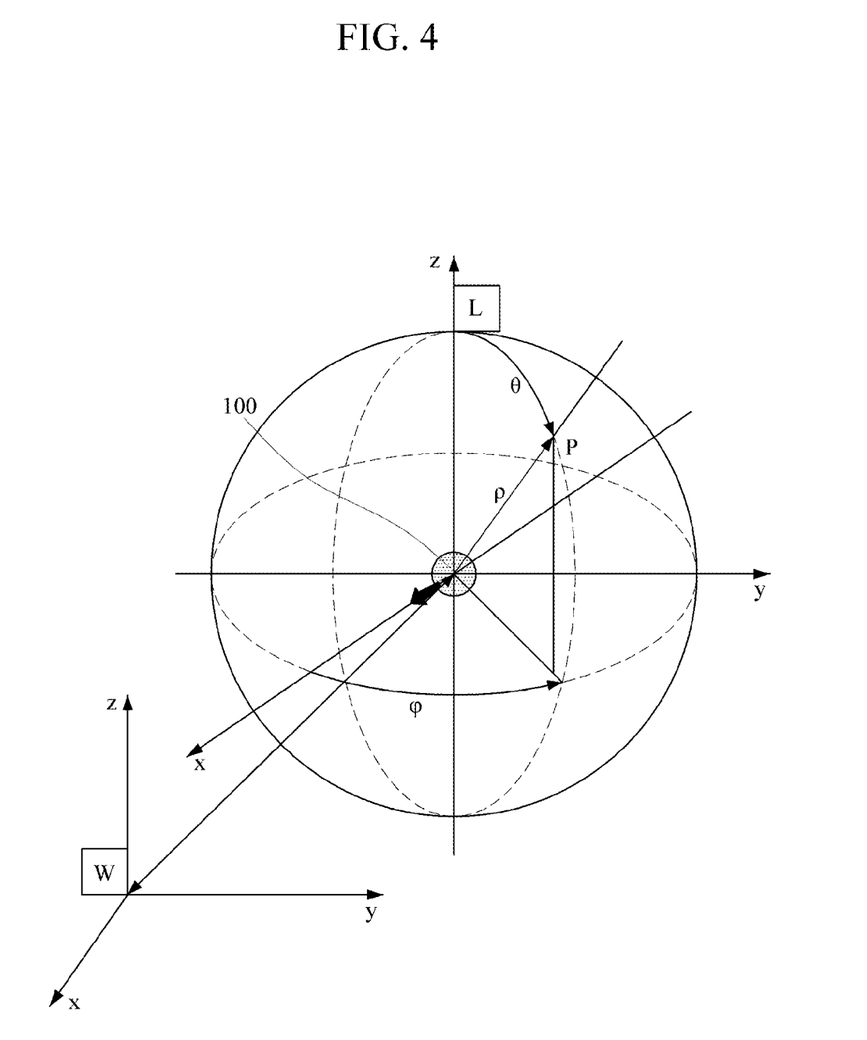
FIG. 4 is a diagram that illustrates a range landmark modeled in a spherical coordinate system.

FIG. 4 is a diagram illustrating a range landmark modeled in a spherical coordinate system.

A range landmark is expressed based on an initial position of the position recognizing apparatus 100 when the position recognizing apparatus 100 initially observes a range landmark. As described above, the range landmark is modeled using the position and the posture of the position recognizing apparatus 100, and the distance and the angle between the range landmark and the position recognizing apparatus 100 observed by the range sensor 110.

The position of the position recognizing apparatus 100 is expressed in 3-dimensional coordinates in the world coordinate system. The range landmark is modeled as Equation 5 using the spherical coordinate system.

$$L = [R_x R_y R_z \alpha \beta \gamma \rho \phi \theta]$$ [Equation 5]

($R_X$, $R_y$, $R_z$) represent the initial position of the position recognizing apparatus 100 when the distance between the position recognizing apparatus 100 and the range landmark is initially observed by the position recognizing apparatus 100. (α, β, γ) represent the posture of the position recognizing apparatus 100. The X-axis represents the travelling direction of the position recognizing apparatus 100. ρ represents the distance sensed by the range sensor 110. φ and θ represent angles that may be set depending on a model to set the candidate range landmark, based on the initial travelling direction of the position recognizing apparatus 100. That is, a relative coordinate system of the position recognizing apparatus 100 is defined based on the position and the posture of the position recognizing apparatus 100 and the position of the range landmark is expressed in spherical coordinates based on the relative coordinate system.

As described above, the candidate range landmark generating unit (210, in FIG. 2) generates a plurality of pieces of candidate range landmark information. $R_x$, $R_y$, $R_z$, α, β, γ and ρ are presumed to be same, while the combination of φ and θ is different among the plurality of pieces of candidate range landmark information.

If the spherical coordinate system is divided into a lower part, an upper part, a front part and a rear part with respect to the travelling direction of the localization apparatus 100, the candidate range landmark information generating unit 210 generates candidate range landmark mark information covering both of the front part and the upper part. Accordingly, the candidate range landmark information generating unit 210 generates candidate range landmark information about at least six candidate range landmarks. For example, candidate range landmarks each using a combination of φ and θ of (0, 90°), (45°, 90°), (−45°, 90°), (45°, 60°), (−45°, 60°), and (0°, 30°) may be set to generate candidate range landmark information.

The initial position h of the range landmark in three-dimensional space on the spherical coordinate system is expressed as Equation 6.

$$h = \begin{pmatrix} h_x \\ h_y \\ h_z \end{pmatrix} = \begin{pmatrix} R_x \\ R_y \\ R_z \end{pmatrix} + R^{CW} \rho m(\phi, \theta)$$ [Equation 6]

$R_x$, $R_y$ and $R_z$ represent the position of the position recognizing apparatus 100 when the distance from the range landmark to the position recognizing apparatus 100 is initially observed by the position recognizing apparatus. $R^{CW}$ represents a rotation matrix used to express the spherical coordinate system L in the world coordinate system W. $R^{CW}$ is expressed as a function of (α, β, γ). ρm(φ, θ) is a vector representing the position of the range landmark on a spherical surface of the spherical coordinate system L. Accordingly, the distance $h_a$ between the position recognizing apparatus 100 and the range landmark predicted in the spherical system is defined as $h_a = \sqrt{h_x^2 + h_y^2 + h_z^2}$.

As shown in FIG. 2, the range landmark extracting unit 220 may include a candidate range landmark information update unit 222 and an actual range landmark information determination unit 224. As a new distance is received, the candidate range landmark information update unit 222 updates the candidate range landmark information.

An observation vector $z_k$ representing an observation prediction value is expressed as equation 7.

$$z_k = \begin{pmatrix} h_x \\ h_y \\ h_z \end{pmatrix} = \begin{pmatrix} R_x \\ R_y \\ R_z \end{pmatrix} + R^{CW} \rho m(\phi, \theta) - \begin{pmatrix} r_x \\ r_y \\ r_z \end{pmatrix}$$ [Equation 7]

($r_x$, $r_y$, $r_z$) represent a current position of the position recognizing apparatus 100 in a process of updating candidate range landmark information or a position recognizing process. In update the candidate range landmark information, the current position of the position recognizing apparatus 100 may be input from another module such as the position recognizing unit 130.

For example, but not by way of limitation, in a case where the position recognizing apparatus 100 is a mobile robot, as the travelling distance and direction of the mobile robot is integrated, the current position of the position recognizing apparatus 100 may be input to the candidate range landmark information update unit 222 from an encoder (not shown) for estimating the position and the direction angle of the mobile robot on a plane of a two-dimensional coordinate system. Alternatively, current position information of the position recognizing unit 130, which is estimated by the position recognizing unit 130 by use of previously registered range landmark information, may be input to the candidate range landmark information update unit 222. Alternatively, in a case where the position recognizing unit 130 is configured to recognize the position by use of image information obtained from an image sensor such as a camera, current position information of the position recognizing apparatus 100 estimated by use of the image landmark information, which is obtained by processing the image information, may be input to the candidate range landmark information update unit 222.

The actual range landmark information determination unit 224 of the range landmark extracting unit 220 determines actual range landmark information by use of a covariance of the updated plurality of pieces of candidate range landmark information.

In the polar coordinate system shown in FIG. 3, the covariance C(L̄) for respective candidate range landmarks is expressed as a matrix having a covariance element $c_{ij}$ as shown in equation 8. i represents a row of the matrix, and j represents a column of the matrix.

$$C(\bar{L}) = \begin{bmatrix} C_{xx} & C_{xy} & C_{x\psi} & C_{x\rho} & C_{x\varphi} \\ C_{yx} & C_{yy} & C_{y\psi} & C_{y\rho} & C_{y\varphi} \\ C_{\psi x} & C_{\psi y} & C_{\psi\psi} & C_{\psi\rho} & C_{\psi\varphi} \\ C_{\rho x} & C_{\rho y} & C_{\rho\psi} & C_{\rho\rho} & C_{\rho\varphi} \\ C_{\varphi x} & C_{\varphi y} & C_{\varphi\psi} & C_{\varphi\rho} & C_{\varphi\varphi} \end{bmatrix}$$ [Equation 8]

The covariance C(L̄) of the range landmark in the spherical coordinate system shown in FIG. 4 is defined similarly to equation 8. Accordingly, the covariance C(L̄) of the range landmark in the spherical coordinate system is expressed as a 9×9 matrix.

The size of the covariance matrix C(L̄) of the candidate range landmark information corresponds to the size of principle diagonal components (norm) of the covariance matrix C(L̄) and is defined as equation 9.

$$\text{norm} = \sqrt{\Sigma_i c_{ii}^2}$$ [Equation 9]

The size (or value) of the covariance may be defined in various methods other than the above method, as would be understood by one skilled in the art.

The actual range landmark information determination unit 224 of the range landmark extracting unit 220 may perform a number of updates (e.g., a predetermined number) on the plurality of pieces of candidate range landmark information and determine candidate range landmark information producing the smallest covariance value among the respective pieces of candidate range landmark information, as the actual range landmark information.

Alternatively, the actual range landmark information determination unit 224 may determine candidate range landmark information producing a covariance value having the highest convergence speed among the respective pieces of candidate range landmark information, as the actual range landmark information.

Alternatively, the actual range landmark information determination unit 224 may perform a number of updates (e.g., a predetermined number) on the plurality of pieces of candidate range landmark information and determine the actual candidate range landmark information by removing candidate range landmark information having a covariance value exceeding a value (e.g., a predetermined value) from the updated respective candidate range landmark information.

The candidate range landmark information update unit 222 and the actual range landmark information determination unit 224 may be configured to communicate with each other to perform an operation according to a range landmark extracting method.

Figure 5:
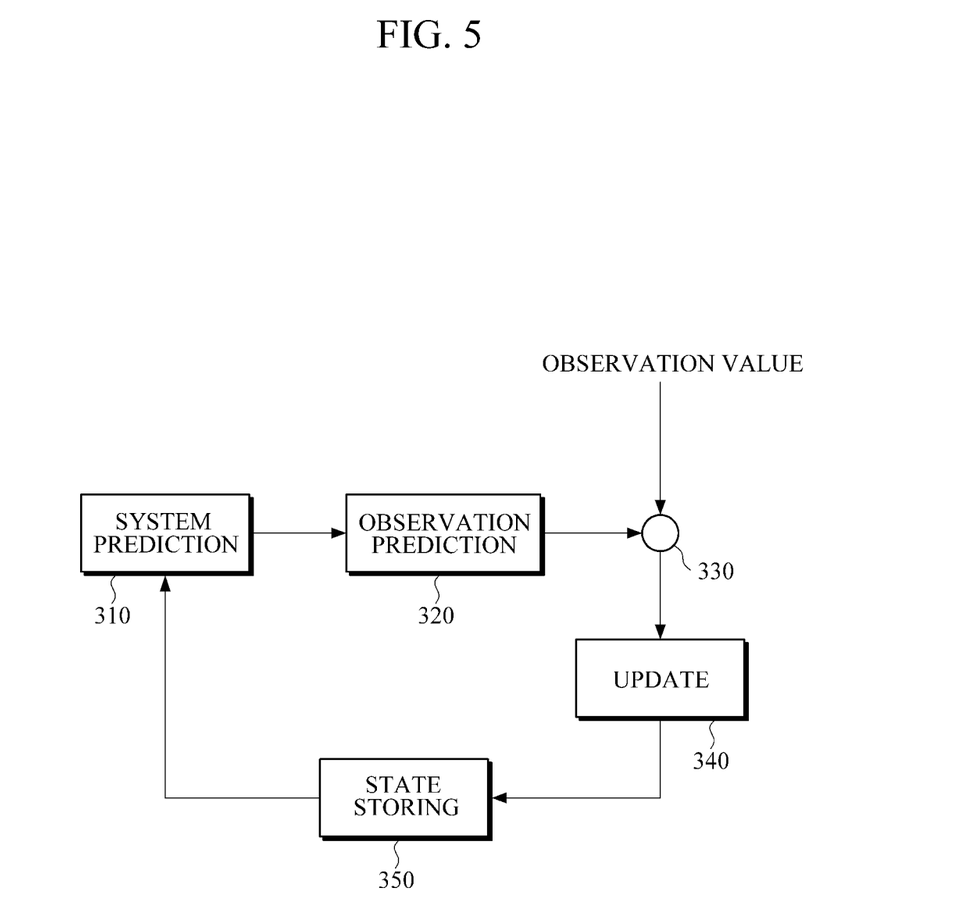
FIG. 5 is a diagram that illustrates operation of a candidate range landmark information update unit shown in FIG. 2 and a state estimation unit shown in FIG. 1.

FIG. 5 is a diagram illustrating operation of a candidate range landmark information update unit shown in FIG. 2 and a state estimation unit shown in FIG. 1.

Candidate range landmark information update and state prediction includes performing system prediction (310), observation prediction (320), a differential operation (330), update (340) and state storing (350).

In system prediction (310), a state variable $x_k$ representing a current system estimation value is output using a previous state variable $x_{k-1|k-1}$ and an input variable $u_k$. The subscript n|m represents a state estimated at a timing point n based on a measurement value obtained at a timing point m.

A state variable $x_k$ estimated by the range landmark information processing unit 120 includes candidate range landmark information. A state variable $x_k$ estimated by the state estimation unit 134 includes the position of the position recognizing apparatus 100, the posture of the position recognizing apparatus 100 and the position of the actual range landmark extracted from a plurality of candidate range landmarks by the range landmark information processing unit 120.

In observation prediction (320), a state value $x_{k|k-1}$ is converted to an observation vector $z_k$ representing an observation prediction value.

In the differential operation (330), a differential result of the observation vector $z_k$ and an actual observation value $z^*_k$ is provided to the update unit 340. The actual observation value $z^*_k$ includes the distance between the position recognizing apparatus 100 and the range landmark sensed by the range sensor 110 shown in FIG. 1. If image landmark information is further used in the position recognizing process, the actual observation value $z^*_k$ may further include position information obtained by projecting the positions of respective image landmarks, which are obtained from an image, onto a 2-dimensional plane corresponding to a lens plane of an image sensor.

In update 340, a final state value $x_{k|k}$ is calculated by use of Kalman gain such that the differential result is minimized. The calculated final state value $x_{k|k}$ is stored in state storing 350. The final state value $X_{k|k}$ is used for estimating a state at a timing point k+1.

Figure 6:
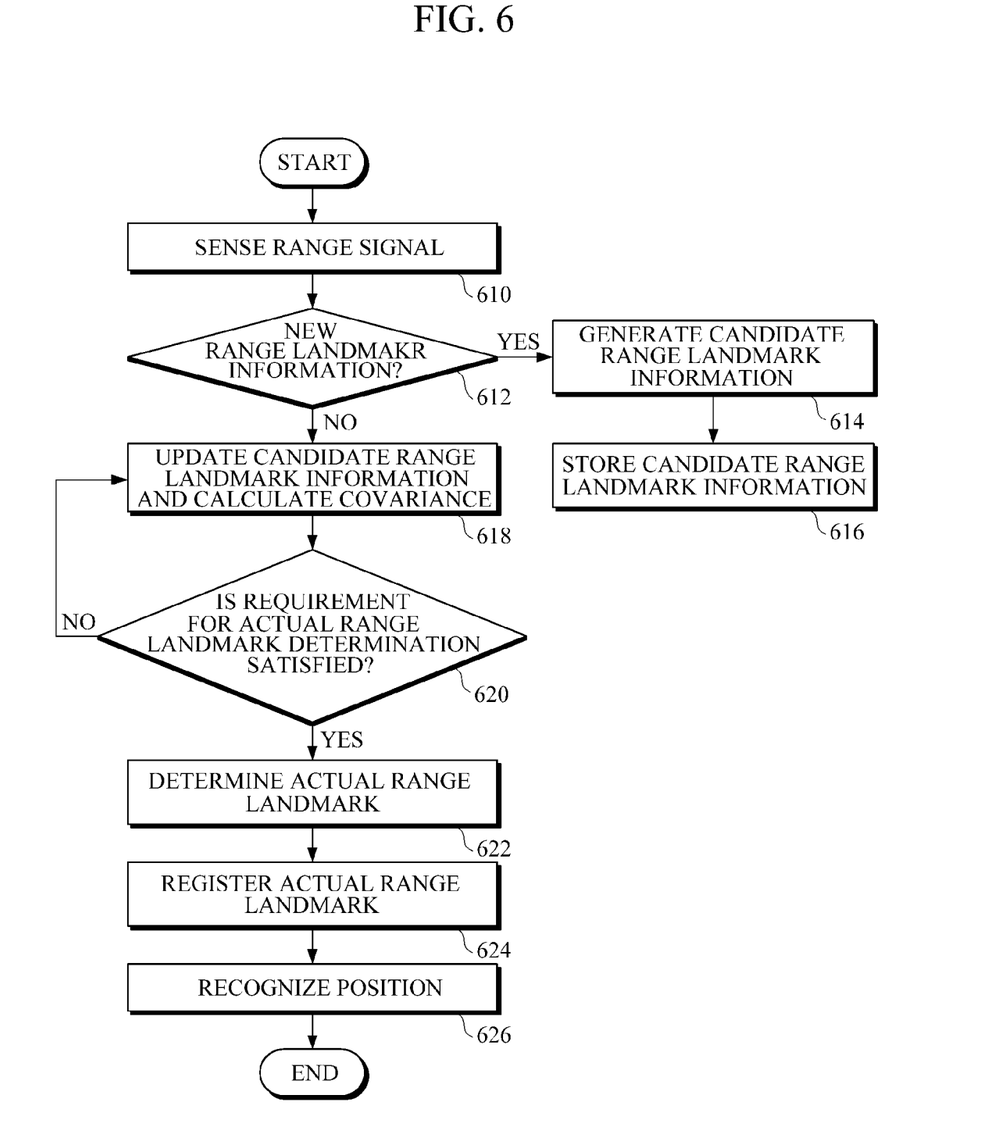
FIG. 6 is a flowchart illustrating an exemplary position recognizing method according to an embodiment.

FIG. 6 is a flowchart illustrating an exemplary position recognizing method according to an embodiment.

The position recognizing apparatus 100 senses a range signal (610). The position recognizing apparatus 100 checks a range landmark identifier from a range signal to identify new range landmark information which has not been previously registered (612).

In a case where input range landmark information is new range landmark information, the position recognizing apparatus 100 generates a plurality of pieces of information about a plurality of candidate range landmarks from the range signal, in which the plurality of pieces of candidate range landmark information are modeled using the position and the posture of the position recognizing apparatus 100, the sensed distance and the angle between the new range landmark and the position recognizing apparatus 100 (614). The position recognizing apparatus 100 stores the plurality of pieces of candidate range landmark information (616).

In a case where input range landmark information is not new range landmark information, the position recognizing apparatus 100 updates ones of the plurality of pieces of candidate range landmark information stored that have the same range landmark identifier, and calculates the covariance of the updated candidate range landmark information (618).

The position recognizing apparatus 100 determines if a requirement for the actual range landmark determination is satisfied (620). As an example, if the position recognizing apparatus 100 repeats a number of updates (e.g., a predetermined number) on candidate range landmark information, it may be determined that the requirement for the actual range landmark determination is satisfied. As another example, the position recognizing apparatus 100 may calculate the convergence speeds of the covariance values of the respective candidate range landmark information for a period of time (e.g., predetermined time period). If the convergence speed of the covariance value of candidate range landmark information exceeds a value (e.g., a critical value), it may be determined that the requirement for the actual range landmark determination is satisfied.

The position recognizing apparatus 100 determines actual range landmark information among a plurality of pieces of candidate range landmark information (622). The position recognizing apparatus 100 registers the determined actual range landmark information (624). The position recognizing apparatus 100 performs position recognition by use of the registered actual range landmark information (626). In the position recognizing process, the position recognizing apparatus 100 estimates the position of the position recognizing apparatus 100 and the position of the actual range landmark by use of the registered actual range landmark information while building a map of a space where the position recognizing apparatus 100 moves.

In estimating the position of the range landmark, a range landmark is modeled using a polar coordinate system or a spherical coordinate system to be suitable for a probability distribution model of existence of the range landmark, so that the position of the range landmark converges (e.g., rapidly and precisely) using fewer virtual landmark models. Accordingly, the position recognizing apparatus may provide improve position estimation performance.

The above-described embodiments can also be embodied as computer readable codes which are stored on a computer readable recording medium (e.g., non-transitory) and executed by a processor or computer. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A position recognizing apparatus comprising:
a range sensor which senses a distance between the position recognizing apparatus and a range landmark;
a candidate range landmark information generating unit which generates a plurality of pieces of candidate range landmark information of a plurality of candidate range landmarks including the range landmark, wherein the plurality of pieces of candidate range landmark information are modeled using an initial position and a posture of the position recognizing apparatus, the sensed distance between the position recognizing apparatus and the range landmark and a preset angle to set the plurality of pieces of candidate range landmark information based on an initial travelling direction of the position recognizing apparatus;

a range landmark extracting unit which, if a new distance between the position recognizing apparatus and the range landmark is sensed, updates the plurality of pieces of candidate range landmark information and extracts actual range landmark information of the range landmark among the updated plurality of pieces of candidate range landmark information by use of a covariance of the updated plurality of pieces of candidate range landmark information; and
a position recognizing unit which recognizes a position of the position recognizing apparatus based on the extracted actual range landmark information.

2. The position recognizing apparatus of claim 1, wherein the candidate range landmark information generating unit models the plurality of pieces of candidate range landmark information in a polar coordinate system if a range signal generator corresponding to the range landmark is located at an identical plane to a plane where the position recognizing apparatus moves.

3. The position recognizing apparatus of claim 1, wherein the candidate range landmark information generating unit models the plurality of pieces of candidate range landmark information in a spherical coordinate system if a range signal generator corresponding to the range landmark is located at a plane different from a plane where the position recognizing apparatus moves.

4. The position recognizing apparatus of claim 1, wherein the plurality of pieces of candidate range landmark information are modeled in a polar coordinate system, and the candidate range landmark information generating unit generates the plurality of pieces of candidate range landmark mark information at a first angular position which is distant from the position recognizing apparatus by the sensed distance in the travelling direction of the position recognizing apparatus, at a second angular position which proceeds from the first angular position by a preset angle based on the travelling direction of the position recognizing apparatus, and a third angular position which recedes from the first angular position by a preset angle based on the travelling direction of the position recognizing apparatus.

5. The position recognizing apparatus of claim 1, wherein the plurality of pieces of candidate range landmark mark information are modeled as a spherical coordinate system, the spherical coordinate system is divided into a lower part, an upper part, a front part and a rear part with respect to the travelling direction of the localization apparatus, and the candidate range landmark information generating unit generates the plurality of pieces of candidate range landmark mark information covering both of the front part and the upper part.

6. The position recognizing apparatus of claim 1, wherein the range landmark extracting unit performs a number of updates on the plurality of pieces of candidate range landmark information and determines candidate range landmark information producing a smallest covariance value among the candidate range landmark information, as the actual range landmark information.

7. The position recognizing apparatus of claim 1, wherein the range landmark extracting unit determines candidate range landmark information producing a covariance value having a highest convergence speed among the candidate range landmark information, as the actual range landmark information.

8. The position recognizing apparatus of claim 1, wherein the range landmark extracting unit uses at least one of a position of the position recognizing apparatus estimated using an image landmark and a position of the position recognizing apparatus estimated using previously registered range landmark information.

9. A position recognizing method comprising:
sensing a distance between a range landmark and a position recognizing apparatus;
generating a plurality of pieces of candidate range landmark information of a plurality of candidate range landmarks including the range landmark, wherein the plurality of pieces of candidate range landmark information are modeled using an initial position and a posture of the position recognizing apparatus, the sensed distance between the position recognizing apparatus and the range landmark and a preset angle to set the plurality of pieces of candidate range landmark information based on an initial travelling direction of the position recognizing apparatus;
if a new distance between the position recognizing apparatus and the range landmark is sensed, updating the plurality of pieces of candidate range landmark information;
extracting actual range landmark information of the single range landmark among the updated plurality of pieces of candidate range landmark information by use of a covariance of the updated plurality of pieces of candidate range landmark information; and
recognizing a position of the position recognizing apparatus based on the extracted actual range landmark information.

10. The position recognizing method of claim 9, wherein the generating the candidate range landmark information comprises modeling the plurality of pieces of candidate range landmark information in a polar coordinate system if a range signal generator corresponding to the range landmark is located at an identical plane to a plane where the position recognizing apparatus moves.

11. The position recognizing method of claim 9, wherein the generating the candidate range landmark information comprises modeling the plurality of pieces of candidate range landmark information in a spherical coordinate system if a range signal generator corresponding to the range landmark is located at a plane different from a plane where the position recognizing apparatus moves.

12. The position recognizing method of claim 9, wherein the extracting the actual range landmark information comprises performing a number of updates on the plurality of pieces of candidate range landmark information and determining candidate range landmark information producing a smallest covariance value among the plurality of pieces of candidate range landmark information, as the actual range landmark information.

13. The position recognizing method of claim 9, wherein the extracting the actual range landmark information comprises determining candidate range landmark information producing a covariance value having a highest convergence speed among the plurality of pieces of candidate range landmark information as the actual range landmark information.

* * * * *